Jan. 6, 1925.

E. O. GUYOT

COOKING UTENSIL

Filed June 26, 1924

1,522,445

Inventor
E. O. Guyot.
By
Attorney

Patented Jan. 6, 1925.

1,522,445

UNITED STATES PATENT OFFICE.

EMIL OLIVER GUYOT, OF UKIAH, CALIFORNIA.

COOKING UTENSIL.

Application filed June 26, 1924. Serial No. 722,514.

*To all whom it may concern:*

Be it known that I, EMIL O. GUYOT, a citizen of the United States, residing at Ukiah, in the county of Mendocino and State of California, have invented certain new and useful Improvements in Cooking Utensils; and I do hereby declare the following to be a full, clear, and exact description of the invention, such as will enable others skilled in the art to which it appertains to make and use the same.

This invention relates to an article for use in the kitchen and facilitates the preparation of food and is designed particularly for removing dirt and other foreign matter from beans, peas and the like.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawing forming a part of the application:—

Corresponding and like parts are referred to in the following description and designated in the several views of the drawings by like reference characters.

Figure 1:
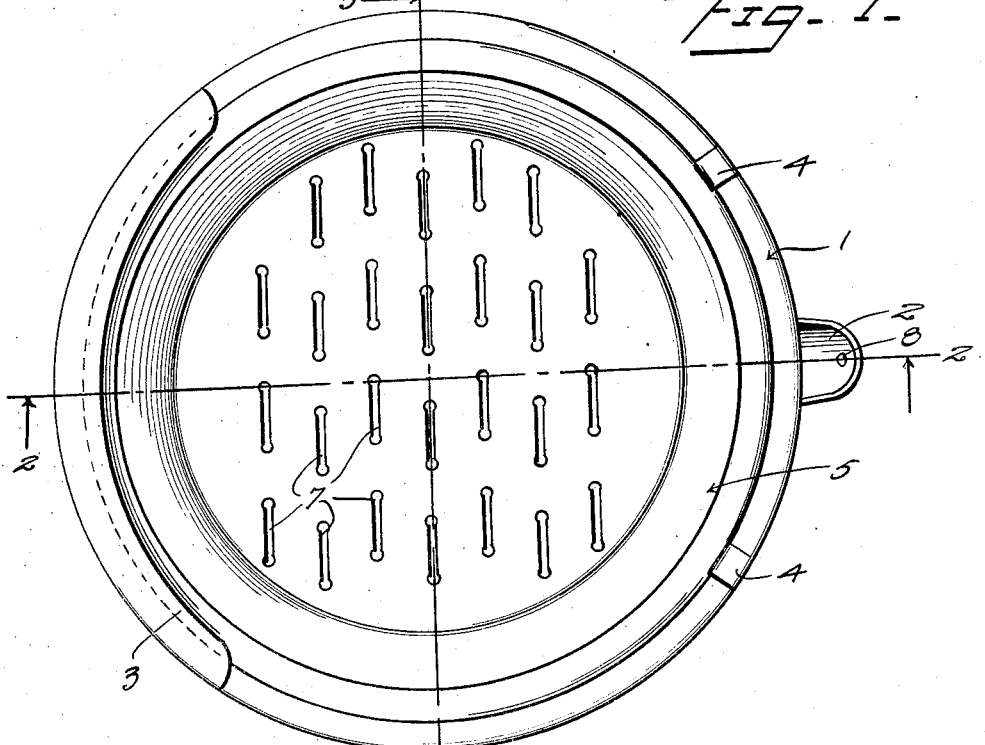
Figure 1 is a top plan view of the utensil embodying the invention.
Figure 2:
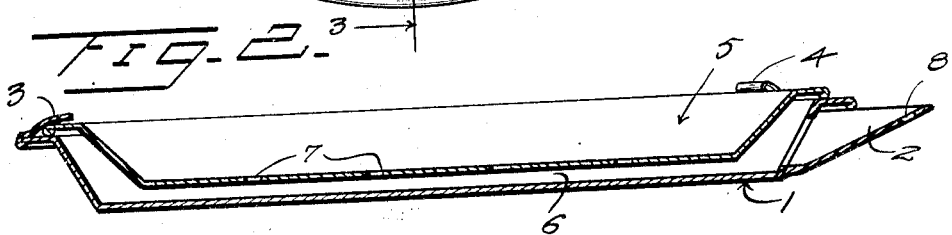
Figure 2 is a sectional view on the line 2—2 of Figure 1.
Figure 3:
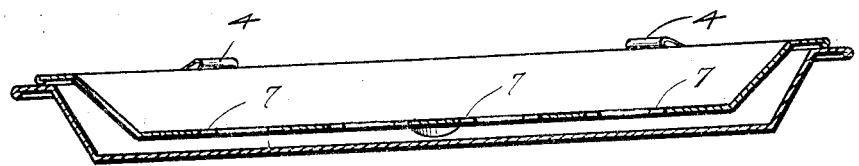
Figure 3 is a sectional view on the line 3—3 of Figure 1.

The device comprises a lower pan 1 provided at one side with a spout 2 and having an inwardly disposed lip 3 opposite the spout 2 and catches 4 upon opposite sides of the spout. An upper pan 5 similar in construction to the lower pan 1 is adapted to fit within the latter so as to leave a space 6. The rim of the pan 5 engages and rests upon the rim of the pan 1 and a portion engages under the lip 3 and other portions are engaged by the catches 4 whereby the pan 5 is held in place against accidental displacement. A plurality of openings 7 are formed in the bottom of the pan 5 and provide for an escape of dirt and other foreign matter of a less size than the beans or other article of food being cleaned. Any large particles, such as gravel or pieces of pod of a size too large to pass through the openings 7, are removed by the hand and dropped into the spout 2 and enter the space 6 formed between the two pans. An opening 8 is formed in the spout 2 and provides for the reception of a nail or other suspending device for receiving the utensil when stowed away.

The beans are supplied to the pan 5 in small quantities after which the device is moved about to cause dust and other small particles to pass through the openings 7. Other particles too large to pass through the openings 7 are removed by hand and dropped into the spout 2.

What is claimed is:—

A food cleaner comprising upper and lower pans spaced apart, the upper pan having openings in its bottom, said lower pan being provided at one side with a spout to receive foreign matter too large to pass through the openings in the bottom of the upper pan, and a retaining lip and catches upon the rim of the lower pan to engage the rim of the upper pan and prevent casual displacement of the two pans.

In testimony whereof I affix my signature in presence of two witnesses.

EMIL OLIVER GUYOT.

Witnesses:
N. H. IVERSEN,
D. GILES.